US009853466B2

(12) United States Patent
Reisz et al.

(10) Patent No.: US 9,853,466 B2
(45) Date of Patent: Dec. 26, 2017

(54) METHOD AND APPARATUS FOR FAST CHARGING LI BASED RECHARGABLE BATTERIES

(71) Applicant: Advanced Battery Management Systems, Inc., Plano, TX (US)

(72) Inventors: Attila Reisz, Pilisjaszfalu (HU); Jozsef Marinka-Toth, Budapest (HU); Bill Hart, Plano, TX (US)

(73) Assignee: ADVANCED BATTERY MANAGEMENT SYSTEMS, LLC, Plano, TX (US)

( * ) Notice: Subject to any disclaimer, the term of this patent is extended or adjusted under 35 U.S.C. 154(b) by 89 days.

(21) Appl. No.: 14/702,488

(22) Filed: May 1, 2015

(65) Prior Publication Data

US 2016/0322841 A1 Nov. 3, 2016
US 2017/0133869 A9 May 11, 2017

Related U.S. Application Data

(60) Provisional application No. 61/987,297, filed on May 1, 2014, provisional application No. 61/987,290, filed on May 1, 2014.

(51) Int. Cl.
*H02J 7/00* (2006.01)

(52) U.S. Cl.
CPC .......... *H02J 7/0031* (2013.01); *H02J 7/007* (2013.01); *H02J 7/0057* (2013.01)

(58) Field of Classification Search
CPC ....... H02J 7/0031; H02J 7/0057; H02J 7/0072
USPC ...................................................... 320/153
See application file for complete search history.

(56) References Cited

U.S. PATENT DOCUMENTS

| | | | | |
|---|---|---|---|---|
| 3,599,071 A | * | 8/1971 | Lapuyade et al. ..... | H02J 7/0091 307/66 |
| 3,767,995 A | * | 10/1973 | Kaminski et al. ..... | H02J 7/0091 320/106 |
| 4,673,862 A | * | 6/1987 | Wahlstrom ............. | H02J 7/245 320/160 |
| 5,550,453 A | * | 8/1996 | Bohne et al. ......... | H02J 7/0081 320/148 |
| 5,708,350 A | * | 1/1998 | Tibbs ................... | H02J 7/0031 320/153 |
| 6,313,605 B1 | * | 11/2001 | Tsenter ................. | H02J 7/0073 320/125 |
| 7,190,171 B2 | * | 3/2007 | Kawakami et al. .................. | G01R 31/3662 324/430 |
| 7,598,709 B2 | * | 10/2009 | Guang et al. ......... | H02J 7/0077 320/135 |
| 8,643,342 B2 | * | 2/2014 | Mehta et al. ......... | H02J 7/0073 320/160 |

(Continued)

*Primary Examiner* — Sun Lin
(74) *Attorney, Agent, or Firm* — Culhane Meadows; Robert C. Klinger (57) ABSTRACT

A method and system for charging a rechargeable battery, such as a Lithium based battery, by applying a voltage charge signal, and monitoring a battery charging current and a varying internal resistance of the rechargeable battery and changes in open circuit voltage of the rechargeable battery. The voltage charge signal is dynamically established as a function of the varying internal resistance of the rechargeable battery during charging and the changes in open circuit voltage of the rechargeable battery. The voltage charge signal is a function of a state of charge (SOC) of the rechargeable battery.

14 Claims, 9 Drawing Sheets

(56) References Cited

U.S. PATENT DOCUMENTS

| | | | | |
|---|---|---|---|---|
| 9,035,616 B2* | 5/2015 | Wortham et al. | .... | G01R 31/362 320/125 |
| 2012/0139546 A1* | 6/2012 | Wortham et al. | .... | G01R 31/362 324/427 |
| 2014/0021959 A1* | 1/2014 | Maluf et al. | ....... | G01R 31/3637 324/430 |

* cited by examiner

Figure 3a Generator voltage

Figure 3b  Battery voltage

Figure 3c  Current of battery

Figure 3d – Internal Resistance determination

Figure 4a Generator voltage

Figure 4b Battery voltage

Figure 4c Battery current

Figure 5 Iamax reached

METHOD AND APPARATUS FOR FAST CHARGING LI BASED RECHARGABLE BATTERIES

CLAIM OF PRIORITY

This application claims priority under 35 U.S.C. Section 119(e) of U.S. Provisional application 61/987,297 entitled "Method and Apparatus for Fast Charging Li Polimer Based Rechargable Batteries" filed May 1, 2014, and of U.S. Provisional application 61/987,290 entitled "Method and Apparatus for Fast Charging Li Polimer Based Rechargable Batteries" filed May 1, 2014, the teaching of each is incorporated by reference herein in their entirety.

FIELD OF THE DISCLOSURE

This disclosure is generally directed to charging rechargeable batteries, and more particularly to charging Lithium (Li) based rechargeable batteries.

BACKGROUND

Conventional batteries are based on a plurality of technologies, such as lead acid, nickel cadmium, and Lithium just to name a few. An advantage of Lithium based batteries is the high charge capacity for a unit size, and the life of the battery.

Efficiently and quickly charging batteries remains one of the key challenges in battery technology. While a constant voltage constant current (CCCV) charging signal is acceptable, it is not usually the most efficient or quickest charging algorithm, and may limit the number of times a battery can be charged, referred to as charge cycles, thus reducing the life of the battery. Pulse charging a battery is sometimes more efficient, wherein a battery voltage and/or current charging signal is pulsed. Pulse charging may increase the charge rate (and thus reduce charge time) and extend the useful life of a battery. Care must be taken to minimize the generation of heat in the battery during charging, which heat reduces the useful life of the battery.

A Lithium based battery is a more complex battery, thus, advanced charging signal algorithms may help increase the charging rate of the battery, thus reducing charge times, reduce heating of the battery, and increase battery life.

SUMMARY

A method and system for charging a rechargeable battery, such as a Lithium based battery, by applying a voltage charge signal, and monitoring a battery charging current and a varying internal resistance of the battery. The voltage charge signal is dynamically established as a function of the measured varying internal resistance of the battery during charging. The voltage charge signal is a function of a state of charge (SOC) of the battery.

DETAILED DESCRIPTION

Definitions $U_b$ is the actual voltage of the battery in the given situation $I_b$ is the actual current going through the battery in the given situation C means the nominal capacity of the battery. (for example, if the battery is a 10 Ah battery then C=10).

$I_{max}$ is the factory defined maximum current $U_{max}$ is the factory defined maximum voltage $T_{max}$ is the factory defined maximum charge temperature OCV is the Open Circuit Voltage of the battery $OCV_b$ is the OCV of the battery at the beginning of a given charge cycle $OCV_e$ is the OCV of the battery at the end of a given charge cycle OCVTempMultiplier is typically 0.8-1

OCVTempCorrection is the correction value dependent on temperature rise

CycleCount is between 10 to 1000 depending on implementation

Charge Signal is an arbitrary charging signal. The signal starts at zero point. The signal has one maximum value and one maximum point. It is monotonously increasing until the maximum point, then monotonously decreasing to zero point. The frequency of the charging signal is typically 1 Hz to 10 kHz.

Tr is the rest time, when the Diode does not allow the battery to be discharged

Description of Charging Process

Figure 1:
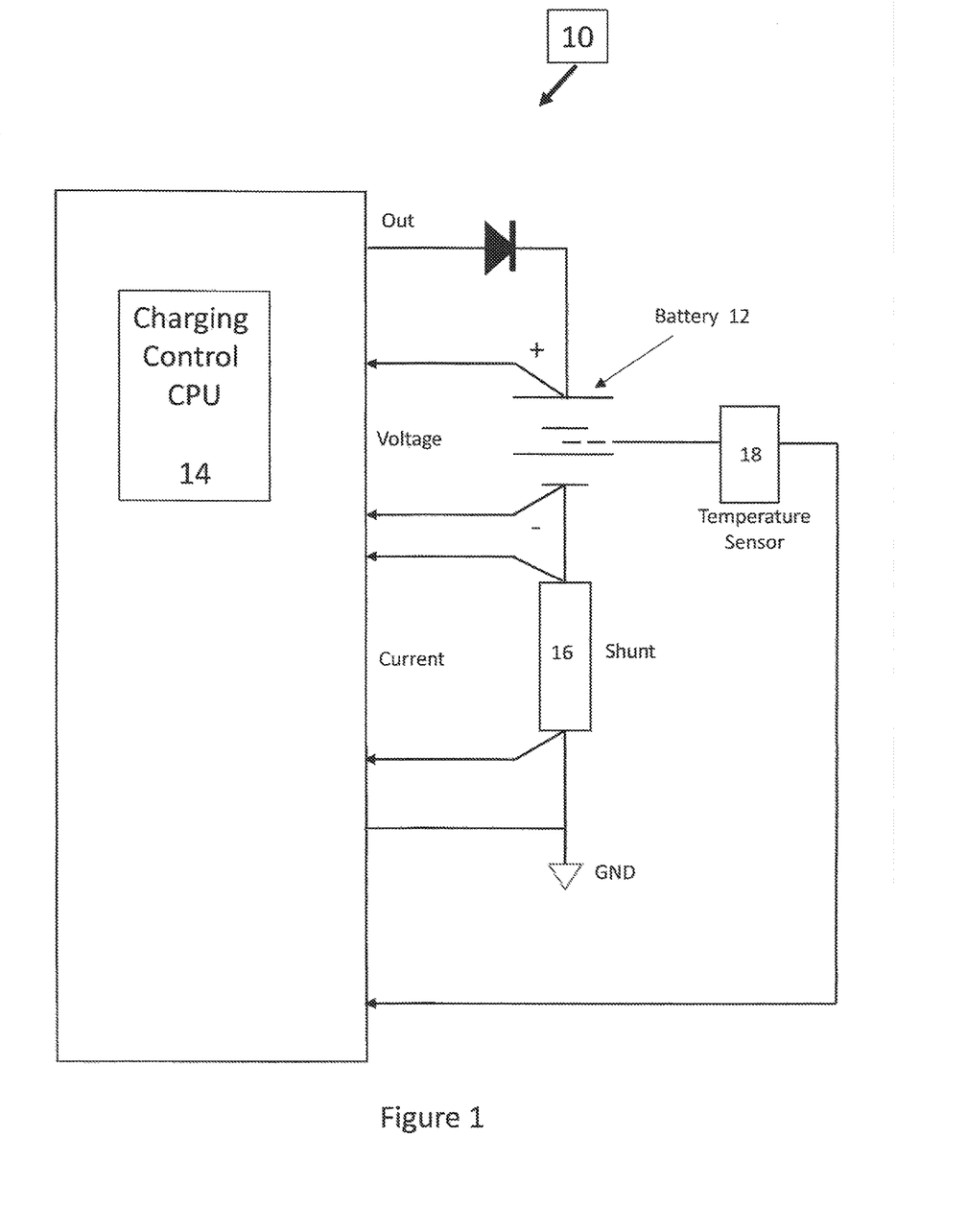
FIG. 1 illustrates a system level diagram of a battery charger configured to charge a rechargeable battery as a function of a charging algorithm.

FIG. 1 illustrates a charger 10 for charging a battery 12. The charger 10 has a controller 14 which comprises one or more processors, a shunt resistor 16 for measuring battery current, and a battery temperature sensor 18 for measuring a temperature of battery 12. Battery current is measured by the controller 14 measuring the voltage drop across the shunt resistor 16 having a known resistance R, where I=V/R. The diode provides reverse current protection.

Figure 2A:
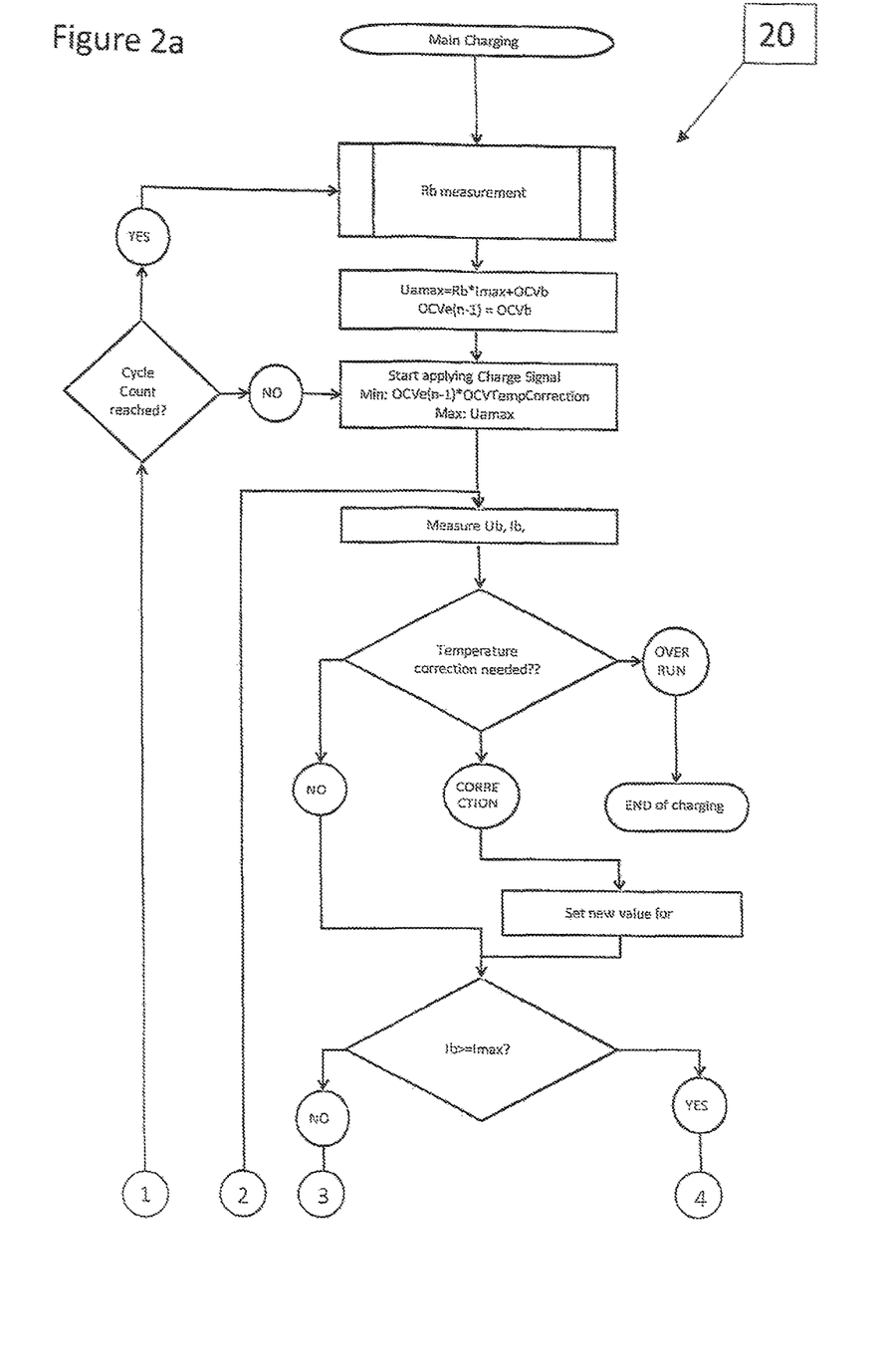
FIGS. 2a-2b illustrate a battery charging algorithm.
Figure 2B:
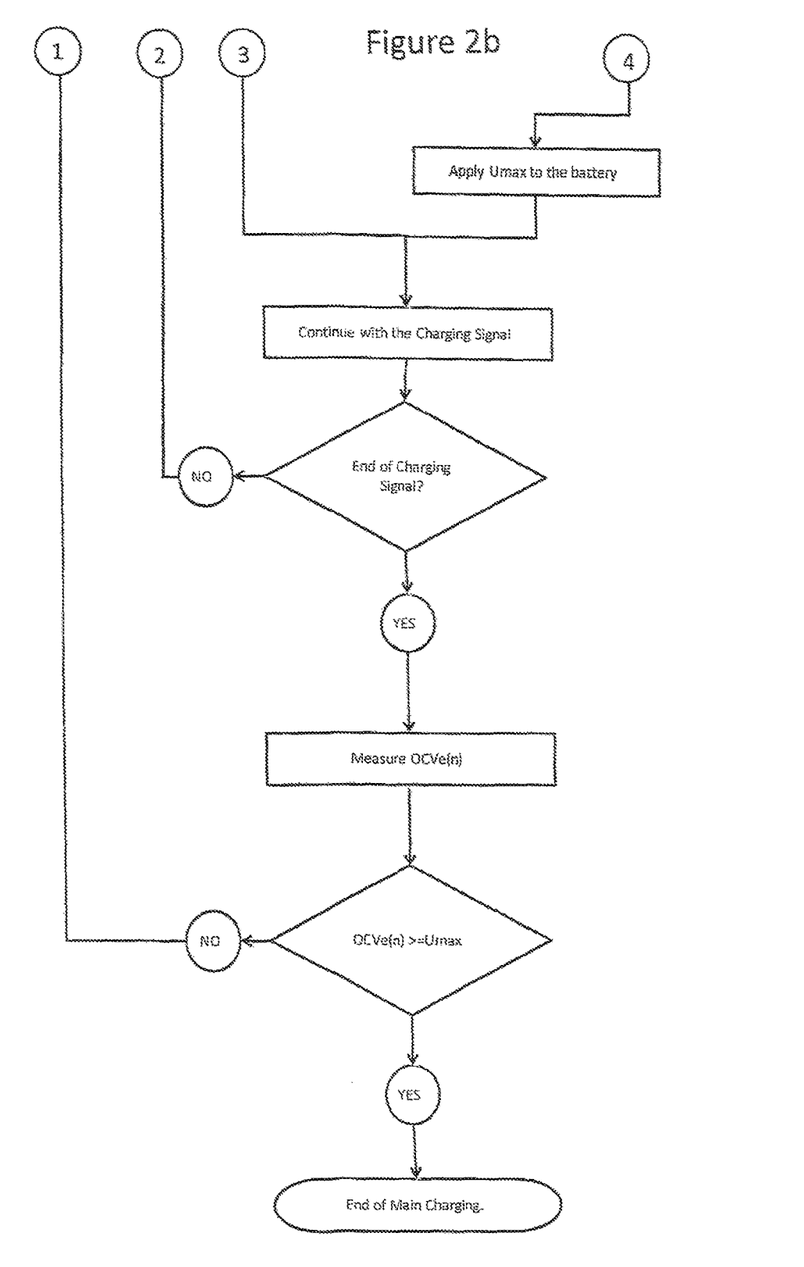

FIG. 2 illustrates a method 20 performed by the controller 14 of charger 10 in FIG. 1 to charge the battery 12 according to one embodiment This method 20 assumes that the battery 12 is in chargeable condition i.e. not "dead". The charging of the battery 12 takes place according to the following charging algorithm.

Start of Charge

Figure 3A:
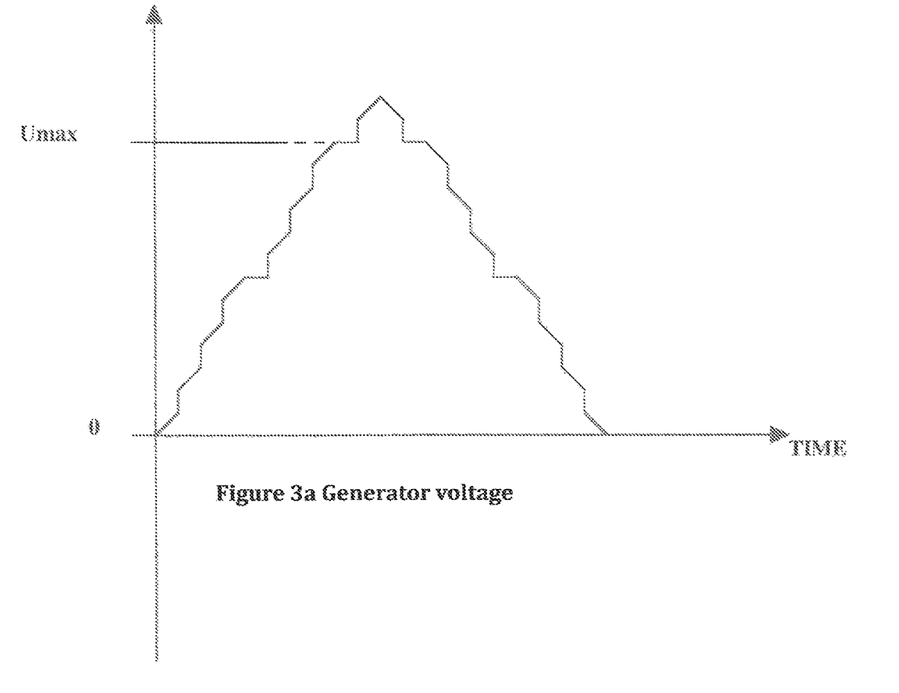
FIGS. 3a-3d illustrate signal waveforms, including a charge signal voltage waveform, a battery voltage waveform, and a current charging waveform, and a battery internal resistance determination for the beginning of the charge.
Figure 3B:
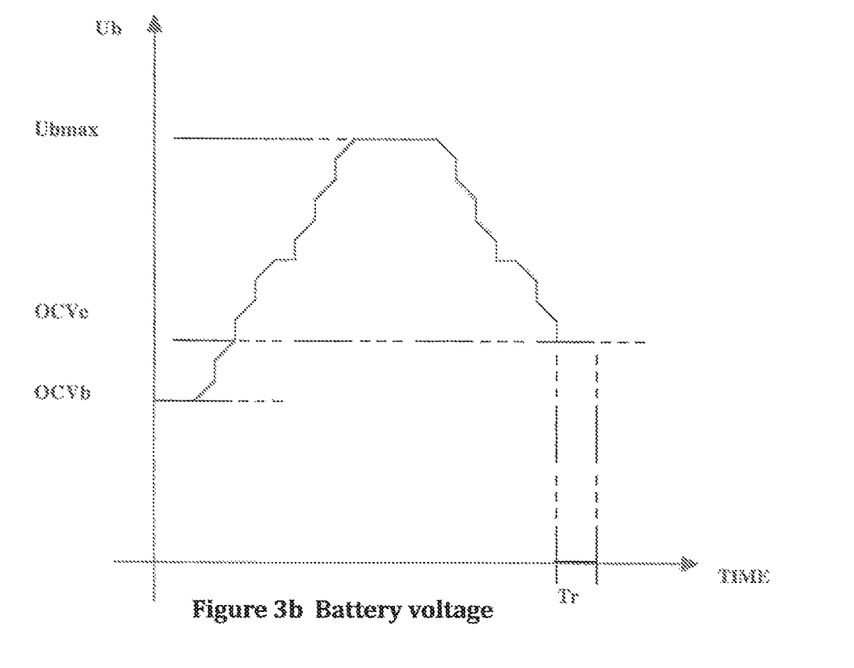
Figure 3C:
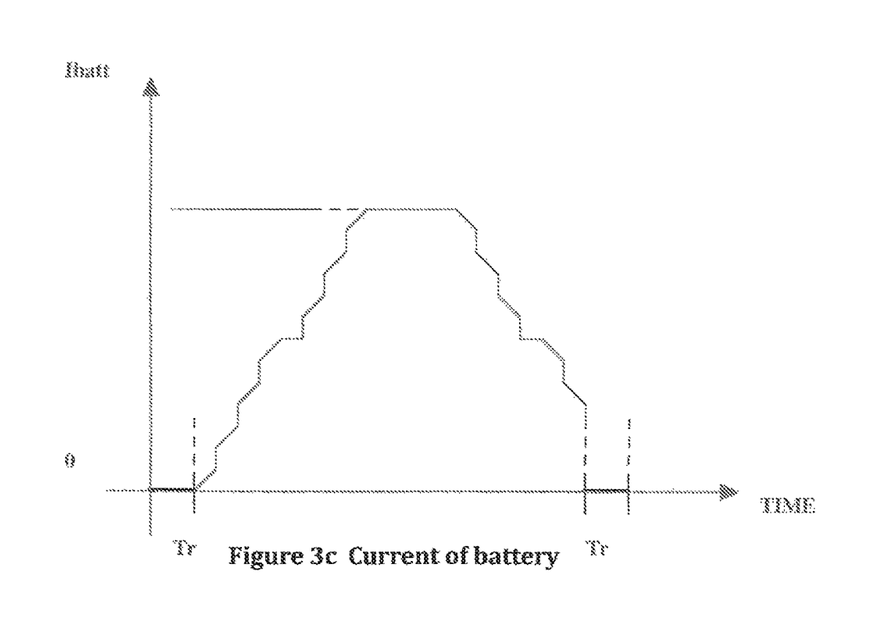

When the battery 12 is put on the charger 10, the battery open circuit voltage OCV is measured in the following manner. The controller 14 applies a ChargeSignal comprising a voltage to the battery 12 as shown in FIG. 3a. The ChargeSignal voltage minimal value is zero, and the ChargeSignal voltage maximal value is Umax. High negative current from the battery is prevented by the diode. $OCV_{b0}$ is defined as the first $U_b$ value during the measurement cycle when $I_b$>zero as seen in FIGS. 3a-3c.

The ChargeSignal has a monotonously increasing first portion and a monotonously decreasing second portion. The ChargeSignal may look like a triangle, but can be of any shape, such as a semicircle.

The controller 14 repeats this cycle N times, where N is typically 3-10. This defines OCVb0 through OCVbN values.

The controller 14 considers these N values and determines the following cases:
1. All values are monotonously decreasing (CASE1)
2. All values are monotonously increasing (CASE2)
3. Other cases (CASE3)

The controller 14 determines if the battery can or cannot be charged.

| | | |
|---|---|---|
| CASE1 | N.A - Battery or system bad. | STOP all activites |
| CASE2 | Battery impedance is high | Battery good, can be charged |
| CASE3 | Battery impedance is low | Battery is either full or cannot be charged. Stop charge. |

Figure 3D:
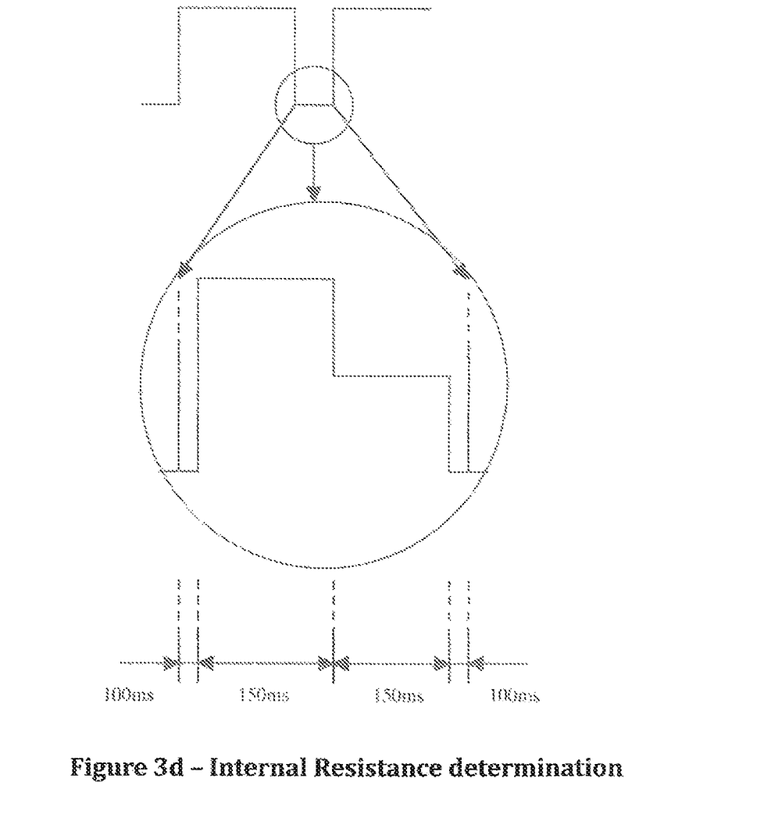

Internal Battery resistance Rb is measured in the following manner as shown in FIG. 3d:

A small current is applied to the battery, C/10 Ampere (A)(I0b), for 150 msec and the battery voltage is measured (U0a). Then, for another 150 msec, current C/20 A (I0b) is applied and battery voltage is measured (U0b). The internal battery impedance is $Rb=(U0a-U0b)/(I0a-I0b)$.

Charging

Uamax is defined by the controller 14 at the beginning of charge:

$$Uamax = OCVb + Rb*Imax$$

Figure 4A:
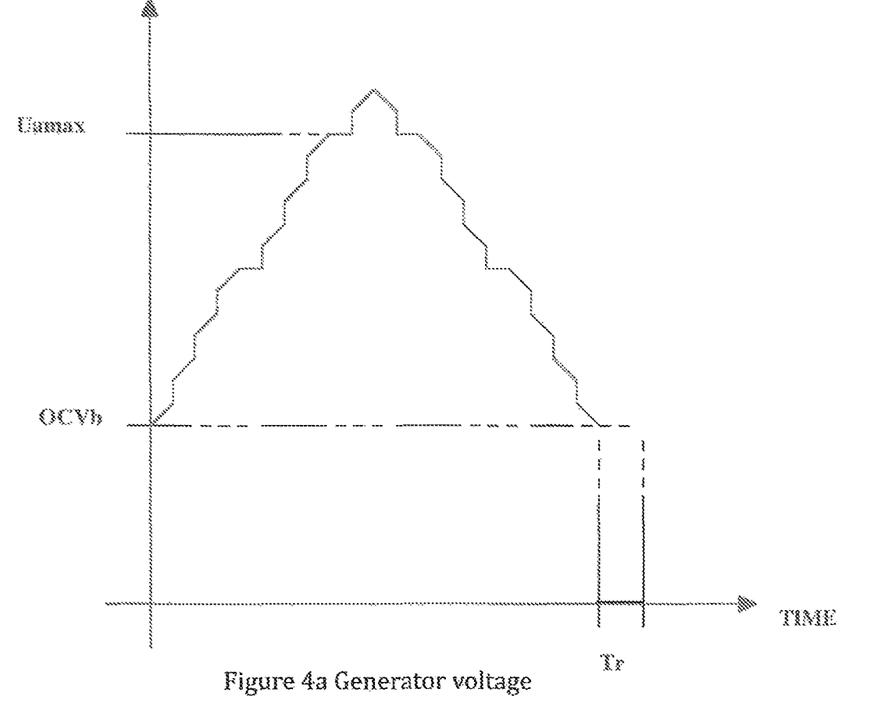
FIGS. 4a-4c illustrate signal waveforms, including a charge signal voltage waveform, a battery voltage waveform, and a current charging waveform used during the main charge.
Figure 4B:
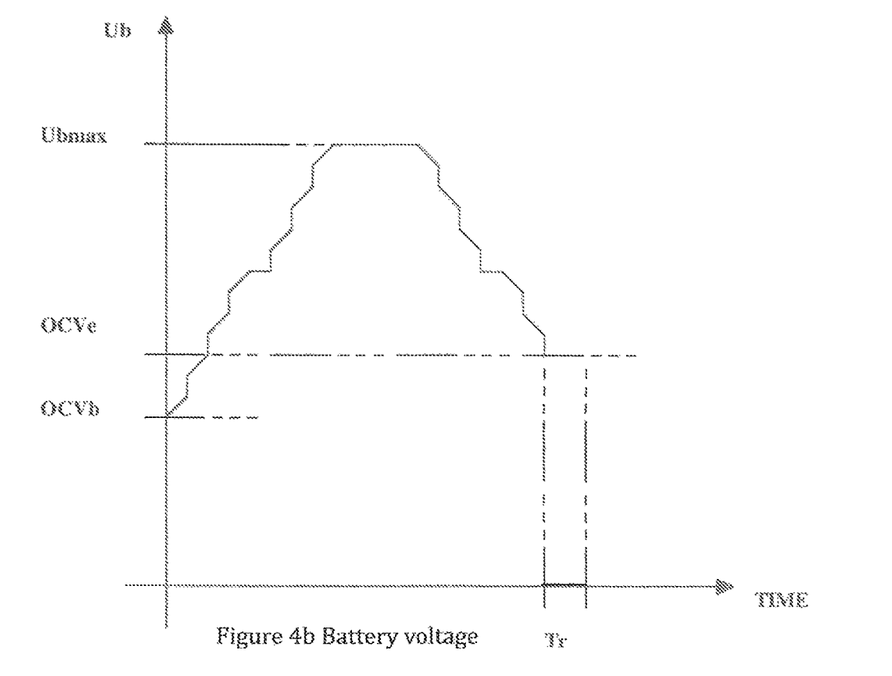
Figure 4C:
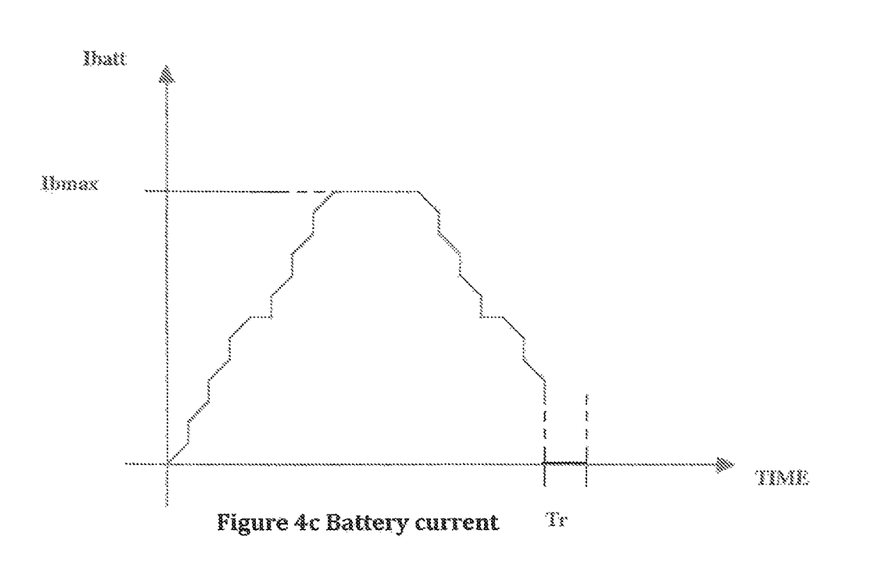

The maximum value for Uamax is Umax.
At the beginning of charge (first cycle) OCVeN equals OCVb as measured before.
OCVTempMultiplier is 1 at the beginning of charge The ChargeSignal voltage signal is applied by the charger 10 to the battery 12. The starting voltage value is the last measured OCV value (OCVeN). Then, the controller 14 increases the ChargeSignal voltage and after a while current response of the battery 12 starts to increase. After reaching its maximum value of Uamax, the controller 14 starts to decrease the ChargeSignal voltage symmetrically as seen in FIGS. 4a-4c. Then, the controller 14 starts the whole cycle again.

Voltage Ub and current Ib is measured by the controller 14 constantly. Voltage OCVe is defined here as the first point after the maximum point of the ChargeSignal voltage when current Ib=0. This OCVe*OCVTempCorrection becomes the starting voltage for the next cycle.

When voltage OCVe is determined to reach the value of Uamax, then the controller 14 applies a constant voltage of Umax to the battery until said battery's current decreases below C*k, where k is typically 0.05 to 0.5 and C is the nominal capacity of the battery. This is the traditional CV charging of the battery.

This cycle is repeated by the controller Cycle Count times.

Measurement Corrections

Correction Based on Internal Resistance Rb of the Battery.

A new Rb value of the battery is determined. Again, a small current is applied to the battery, C/10 Ampere (A) (I0b), for 150 msec and the battery voltage is measured (U0a). Then, for another 150 msec, current C/20 A (I0b) is applied and battery voltage is measured (U0b). The internal battery impedance is $Rb=(U0a-U0b)/(I0a-I0b)$. From this point on this new Rb value is used and the process described in paragraph [0023] is repeated, and iterated. Therefore, the charger 10 dynamically changes the ChargeSignal voltage signal provided to the battery 12 during charging based on the tendency of the changing battery impedance Rb increasing or decreasing.

Maximal Current Signal Modification

Figure 5:
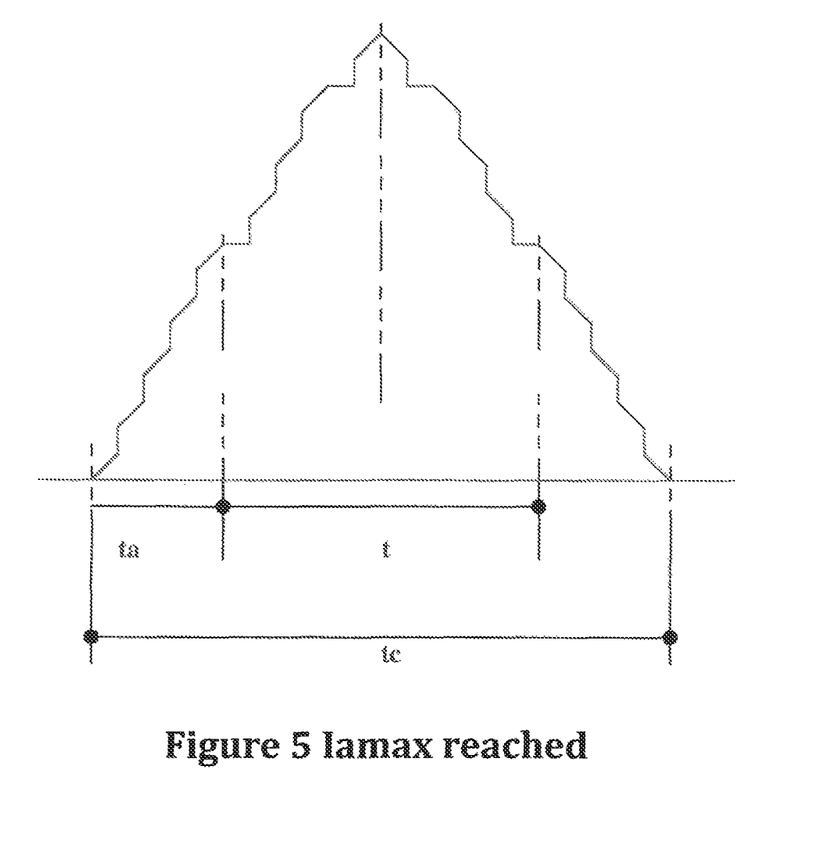
FIG. 5 illustrates a battery current waveform during measurement corrections.

In all phases of charging, battery's current is monitored by the controller 14. In case battery's current reaches or exceeds Imax, the following will happen:

Instead of ChargingSignal, the controller 14 applies Uamax to the battery for t time as seen in FIG. 5.

where $$t = tc - 2*ta$$

where
tc equals the cycle time of Charging Signal
ta equals the time from the beginning of the current cycle
After t time, ChargingSignal resumes its slope.

Temperature Control

Temperature is measured by controller 14 using temperature sensor 18 at every 10 to 60 seconds and the values are stored.

If Tn exceeds Tmax, then the charge is stopped immediately.

If any 5 successive temperature measurements are determined by the controller 14 to show an increase greater than a first limit, then the controller 14 decreases the OCVTempCorrection and OCVTempMultiplier is decreased to 0.95. The new OCVTempCorrection is the old OCVTempCorrection multiplied by OCVTempMultiplier. The first limit may be defined as more than 1 degree Celsius difference between any two measurement points.

If any 5 successive temperature measurements are determined by the controller 14 to show an increase greater than a second limit being greater than the first limit then the charge is stopped immediately. The second limit may be defined as is more than 2 degree Celsius difference between any two measurement points. Different first limits and second limits may be established, and limitation to these limits is not to be inferred.

The charging voltage signal is applied by the controller to the battery as a function of a measured state of charge (SOC) of the battery.

We claim:

1. A method of charging a rechargeable battery, the method comprising the following steps:
   determining, by a controller, a changing battery impedance of said rechargeable battery while applying a charging voltage signal to the rechargeable battery;
   determining, by the controller, an open circuit voltage of the rechargeable battery;
   modifying, by the controller, the charging voltage signal as a function of the determined changing battery impedance and the open circuit voltage of said rechargeable battery; and
   determining, by the controller, a battery temperature of the rechargeable battery during charging, wherein when the battery temperature is determined to increase by an amount less than a first predetermined limit, a voltage level of the charging voltage signal is reduced.

2. The method as specified in claim 1 wherein the controller is configured to:
  determine a tendency of the changing battery impedance during the charging of the rechargeable battery, and
  modify the charging voltage signal as a function of the tendency of the charging battery impedance.

3. The method as specified in claim 2 wherein the controller increases a voltage of the charging voltage signal when the changing battery impedance tends to increase.

4. The method as specified in claim 2 wherein the controller decreases a voltage of the charging voltage signal when the changing battery impedance tends to decrease.

5. The method as specified in claim 1 wherein the charging voltage signal applied to the rechargeable battery creates a battery charging current, and when the created battery charging current reaches a predefined threshold, the charging voltage signal is applied at a constant voltage.

6. The method as specified in claim 1 wherein when the battery temperature is determined to increase by an amount at or greater than a second predetermined limit, charging of the rechargeable battery is ceased, wherein the second predetermined limit is greater than the first predetermined limit.

7. The method as specified in claim 1, wherein the charging voltage signal is applied by the controller to the rechargeable battery as a function of a predetermined state of charge of the rechargeable battery.

8. A system configured to charge a rechargeable battery, the system comprising a controller configured to:
  determine a changing battery impedance while applying a charging voltage signal to the rechargeable battery;
  determine an open circuit voltage of the rechargeable battery;
  modify the charging voltage signal as a function of the determined changing battery impedance and the open circuit voltage of the rechargeable battery; and
  determine a battery temperature of the rechargeable battery by the controller during charging, wherein when the battery temperature is determined to increase by an amount less than a first predetermined limit, a voltage level of the charging voltage signal is configured to be reduced.

9. The system as specified in claim 8, wherein the controller is configured to:
  determine a tendency of the changing battery impedance during the charging of the rechargeable battery, and
  modify the charging voltage signal as a function of the tendency of the charging battery impedance.

10. The system as specified in claim 9 wherein the controller is configured to increase a voltage of the charging voltage signal when the changing battery impedance tends to increase.

11. The system as specified in claim 9 wherein the controller is configured to decrease a voltage of the charging voltage signal when the changing battery impedance tends to decrease.

12. The system as specified in claim 8, wherein the charging voltage signal applied to the rechargeable battery is configured to create a battery charging current, and when the created battery charging current is determined by the controller to reach a predefined threshold, the charging voltage signal is configured to be applied at a constant voltage.

13. The system as specified in claim 8 wherein the controller is configured to determine when the battery temperature increases by an amount at or greater than a second predetermined limit, and responsively to cease charging of the rechargeable battery, wherein the second predetermined limit is greater than the first predetermined limit.

14. The system as specified in claim 8, wherein the controller is configured to apply the charging voltage signal to the rechargeable battery as a function of a predetermined state of charge of the rechargeable battery.

\* \* \* \* \*